US011014500B2

(12) United States Patent
Boehm

(10) Patent No.: US 11,014,500 B2
(45) Date of Patent: May 25, 2021

(54) FOLD-IN OUTSIDE DISPLAY MIRROR

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/842,976

(22) Filed: Dec. 15, 2017

(65) Prior Publication Data

US 2018/0170265 A1    Jun. 21, 2018

Related U.S. Application Data

(60) Provisional application No. 62/435,290, filed on Dec. 16, 2016.

(51) Int. Cl.
*B60R 1/12*          (2006.01)
*B60R 1/00*          (2006.01)
(Continued)

(52) U.S. Cl.
CPC .................. *B60R 1/12* (2013.01); *B60R 1/00* (2013.01); *B60R 1/06* (2013.01); *B60R 1/074* (2013.01); *B60R 1/08* (2013.01); *G02F 1/133382* (2013.01); *H04N 5/2252* (2013.01); *H04N 5/2257* (2013.01); *H04N 5/23293* (2013.01); *H04N 5/23296* (2013.01); *H04N 5/232945* (2018.08); *B60R 2001/1253* (2013.01); *B60R 2300/8046* (2013.01); *B60R 2300/8066* (2013.01); *B60R 2300/8073* (2013.01);
(Continued)

(58) Field of Classification Search
CPC .. B60R 1/00; B60R 1/06; B60R 1/074; B60R 1/08; B60R 1/12; B60R 2001/1253; B60R 2300/8046; B60R 2300/8066; B60R 2300/8073; G02F 1/133382; G02F 1/157; G02F 1/161; G02F 1/163; G02F 2201/44; H04N 5/2252; H04N 5/2257; H04N 5/23293; H04N 5/23296
See application file for complete search history.

(56) References Cited

U.S. PATENT DOCUMENTS 4,798,967 A    1/1989    Yamana et al.
5,557,476 A    9/1996    Oishi
(Continued)

FOREIGN PATENT DOCUMENTS

CN    104742807 A    7/2015
CN    204472689A U    7/2015
(Continued)

*Primary Examiner* — Francis Geroleo
(74) *Attorney, Agent, or Firm* — Price Heneveld LLP; Bradley D. Johnson

(57) ABSTRACT

An external rearview assembly includes a housing pivotally coupled with a vehicle door and operable between an extended position and a retracted position. An electro-optic element is operably coupled with the housing. A display module is disposed proximate the electro-optic element. The display module is activated when the housing is in the retracted position. The display module is deactivated when the housing is in the extended position. An imager is operably coupled with the housing and is configured to capture image data when the housing is in the retracted position and display the image data on the activated display module.

14 Claims, 7 Drawing Sheets

(51) Int. Cl.
  *B60R 1/074* (2006.01)
  *H04N 5/225* (2006.01)
  *H04N 5/232* (2006.01)
  *B60R 1/06* (2006.01)
  *B60R 1/08* (2006.01)
  *G02F 1/1333* (2006.01)
  *G02F 1/157* (2006.01)
  *G02F 1/161* (2006.01)
  *G02F 1/163* (2006.01)

(52) U.S. Cl.
  CPC .............. *G02F 1/157* (2013.01); *G02F 1/161* (2013.01); *G02F 1/163* (2013.01); *G02F 2201/44* (2013.01)

(56) References Cited

U.S. PATENT DOCUMENTS

| | | |
|---|---|---|
| 5,669,705 A | 9/1997 | Pastrick et al. |
| 5,923,457 A | 7/1999 | Byker et al. |
| 6,195,194 B1 | 2/2001 | Roberts et al. |
| 6,244,716 B1 | 6/2001 | Steenwyk et al. |
| 7,324,261 B2 | 1/2008 | Tonar et al. |
| 8,366,284 B2 | 2/2013 | Flynn et al. |
| 9,057,875 B2 | 6/2015 | Fish, Jr. et al. |
| 9,227,575 B2 * | 1/2016 | Bauer ....................... B60R 1/00 |
| 2004/0196368 A1 * | 10/2004 | Asai .......................... B60R 1/00 348/148 |
| 2005/0146604 A1 * | 7/2005 | Shinada .................... B60R 1/00 348/118 |
| 2008/0204556 A1 * | 8/2008 | de Miranda .......... B60R 25/102 348/148 |
| 2010/0182143 A1 * | 7/2010 | Lynam .................. B60R 1/1207 340/465 |
| 2011/0188122 A1 * | 8/2011 | Habibi ...................... B60R 1/08 359/604 |
| 2015/0097955 A1 * | 4/2015 | De Wind ................. B60R 1/062 348/148 |
| 2016/0039341 A1 * | 2/2016 | Schondorf ................ B60R 1/00 348/118 |
| 2016/0243988 A1 | 8/2016 | Peterson et al. |
| 2016/0373620 A1 * | 12/2016 | Sato ........................ B60R 1/00 |
| 2017/0142308 A1 * | 5/2017 | Wang .................. H04N 5/2253 |
| 2017/0158136 A1 * | 6/2017 | Garcia Solache ...... B60R 1/074 |
| 2017/0297489 A1 * | 10/2017 | Fendt ....................... B60R 1/00 |
| 2018/0009394 A1 * | 1/2018 | Okabe ...................... B60R 1/00 |

FOREIGN PATENT DOCUMENTS

| | | | |
|---|---|---|---|
| JP | H10297375 A | | 11/1998 |
| JP | 2001055100 A | | 2/2001 |
| JP | 2010188902 A | | 9/2010 |
| JP | 2016035521 A | | 3/2016 |
| JP | 2016037109 A | * | 3/2016 |
| JP | 2016037109 A | | 3/2016 |
| KR | 20120009153 A | | 2/2012 |

* cited by examiner

FOLD-IN OUTSIDE DISPLAY MIRROR

CROSS-REFERENCE TO RELATED APPLICATION

This application claims priority to and the benefit under 35 U.S.C. § 119(e) of U.S. Provisional Application No. 62/435,290, filed on Dec. 16, 2016, entitled "FOLD-IN OUTSIDE DISPLAY MIRROR," the disclosure of which is hereby incorporated herein by reference in its entirety.

FIELD OF THE DISCLOSURE

The present disclosure generally relates to a display mirror, and more particularly to a fold-in outside display mirror.

SUMMARY OF THE DISCLOSURE

According to one aspect of the present disclosure, an external rearview assembly includes a housing pivotally coupled with a vehicle door and operable between an extended position and a retracted position. An electro-optic element is operably coupled with the housing. A display module is disposed proximate the electro-optic element. The display module is activated when the housing is in the retracted position. The display module is deactivated when the housing is in the extended position. An imager is operably coupled with the housing and is configured to capture image data when the housing is in the retracted position and display the image data on the activated display module.

According to another aspect of the present disclosure, an external rearview assembly for a vehicle includes a housing having a proximal end pivotally coupled with a vehicle door. The housing is operable between an extended position and a retracted position. An electro-optic element is operably coupled with the housing. A display module is disposed proximate the electro-optic element. The display module is activated when the housing is in the retracted position. The display module is deactivated when the housing is in the extended position. An imager is operably disposed on a distal end of the housing and is configured to capture image data behind said vehicle when the housing is in the retracted position.

According to yet another aspect of the present disclosure, an external rearview assembly includes a housing pivotally coupled with a vehicle door and operable between an extended position and a retracted position. An electro-optic element is operably coupled with the housing. A display module is disposed proximate the electro-optic element. The display module is activated when the housing is in the retracted position. The display module is deactivated when the housing is in the extended position. An imager is configured to capture image data and display the image data on the activated display module.

These and other features, advantages, and objects of the present disclosure will be further understood and appreciated by those skilled in the art by reference to the following specification, claims, and appended drawings.

DETAILED DESCRIPTION

Figure 1:
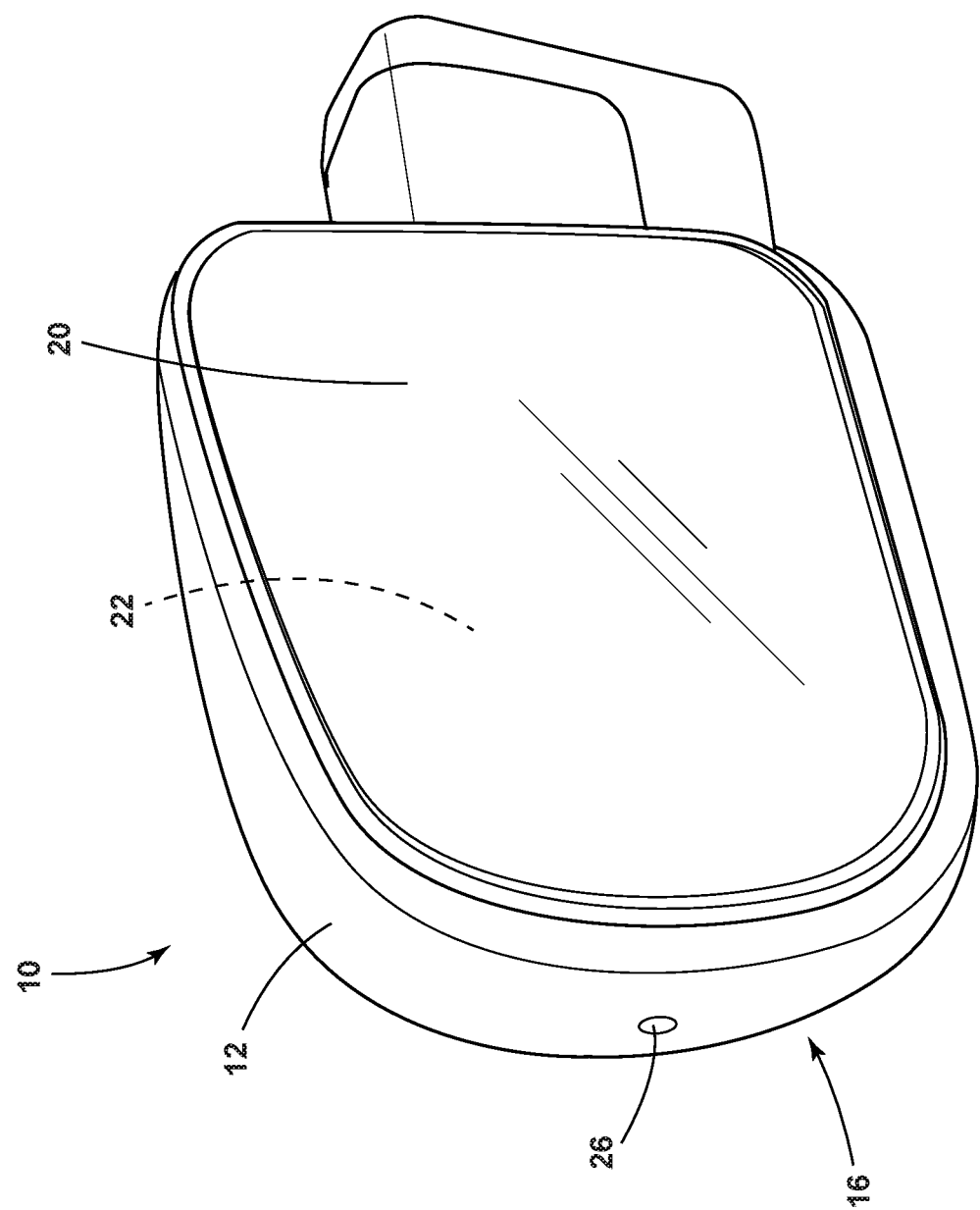
FIG. 1 is an outside front perspective view of an external rearview assembly of the present disclosure.

The present illustrated embodiments reside primarily in combinations of method steps and apparatus components related to a fold-in outside display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to the intended viewer, and the term "rear" shall refer to the surface of the device further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-11, reference numeral 10 generally designates an external rearview assembly that includes a housing 12 pivotally coupled with a vehicle door 14 of a vehicle 15 and operable between an extended position 16 and a retracted position 18. An electro-optic element 20 is operably coupled with the housing 12. A display module 22 is disposed proximate the electro-optic element 20. The display module 22 is activated when the housing 12 is in the retracted position 18. The display module 22 is deactivated when the housing 12 is in the extended position 16. An imager 24 is operably coupled with the housing 12 and is configured to capture image data through an imager lens 26 when the housing 12 is in the retracted position 18 and display the image data on the activated display module 22.

Figure 1A:
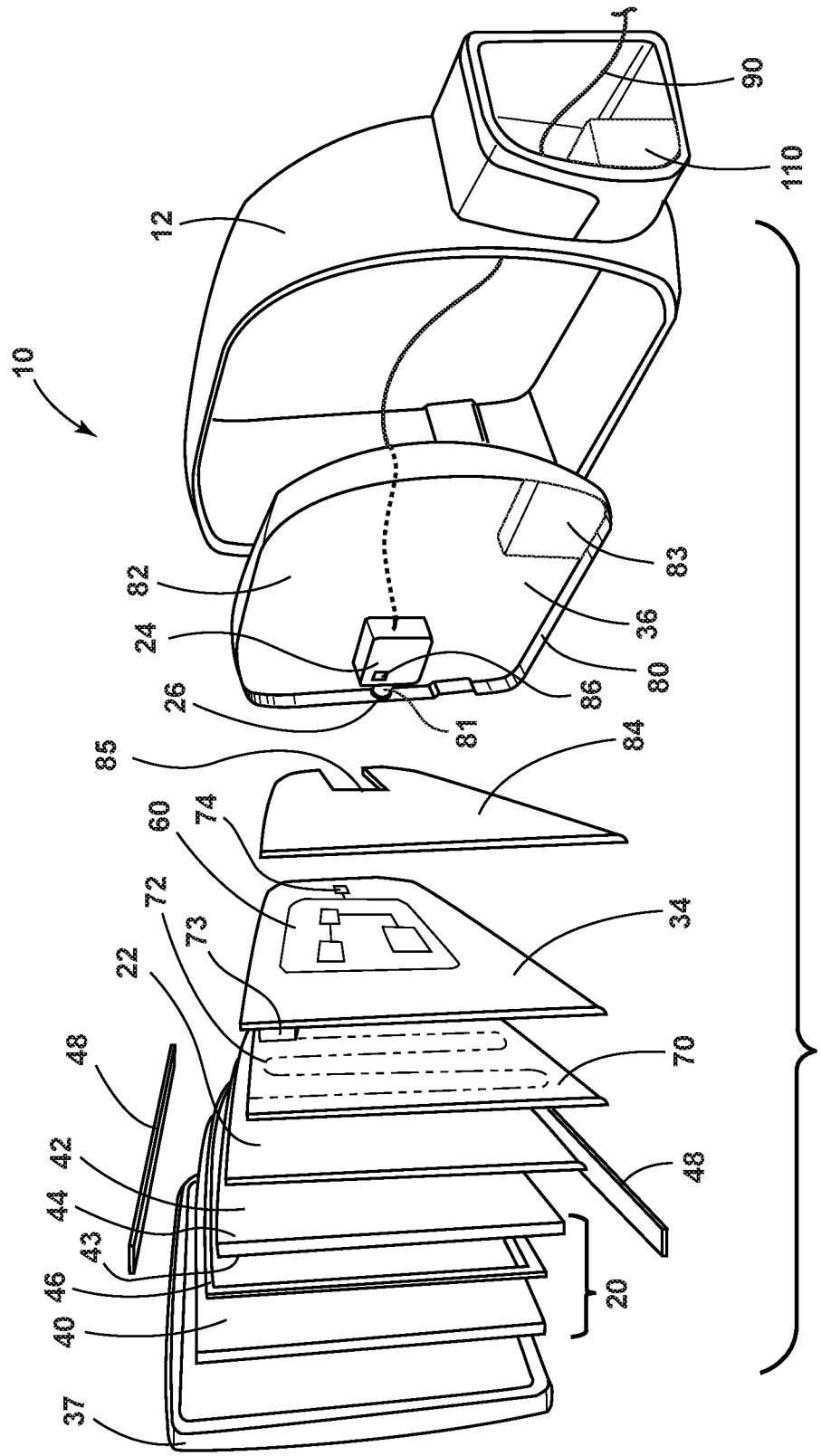
FIG. 1A is a side perspective exploded view of an external rearview assembly of the present disclosure.

With reference now to an exemplary embodiment as shown in FIGS. 1 and 1A, the illustrated external rearview assembly 10 includes the exterior housing 12, the electro-optic element 20, a circuit board 34, the display module 22, a carrier plate 36, and a bezel 37 with the circuit board 34 disposed between the electro-optic element 20 and the carrier plate 36. The external rearview assembly 10 may be held together by a snap-fit connection, interference fit connection, mechanical fasteners, or adhesives. The electro-optic element 20 may be made of glass or any other material or material combination configured for use in exterior mirror applications. The electro-optic element 20 used in the inventive structure can have any contour, including flat, aspheric, or convex, depending on the type of reflection desired. In addition, the electro-optic element 20 can be an electrochromic mirror having front and rear substrates 40, 42, with an electro-optic medium disposed therebetween. It is also contemplated that a front surface 43 or a rear surface 44 of the rear substrate 42 may include a reflective layer configured to display a reflection through the electro-optic medium and the front substrate 40. A seal 46 extends around a periphery of first and second substrates, between the front and rear substrates 40, 42, thereby sealing the material between the substrates. A bus bar 48 is disposed proximate top and bottom edges of the front and rear substrates 40, 42.

Figure 2:
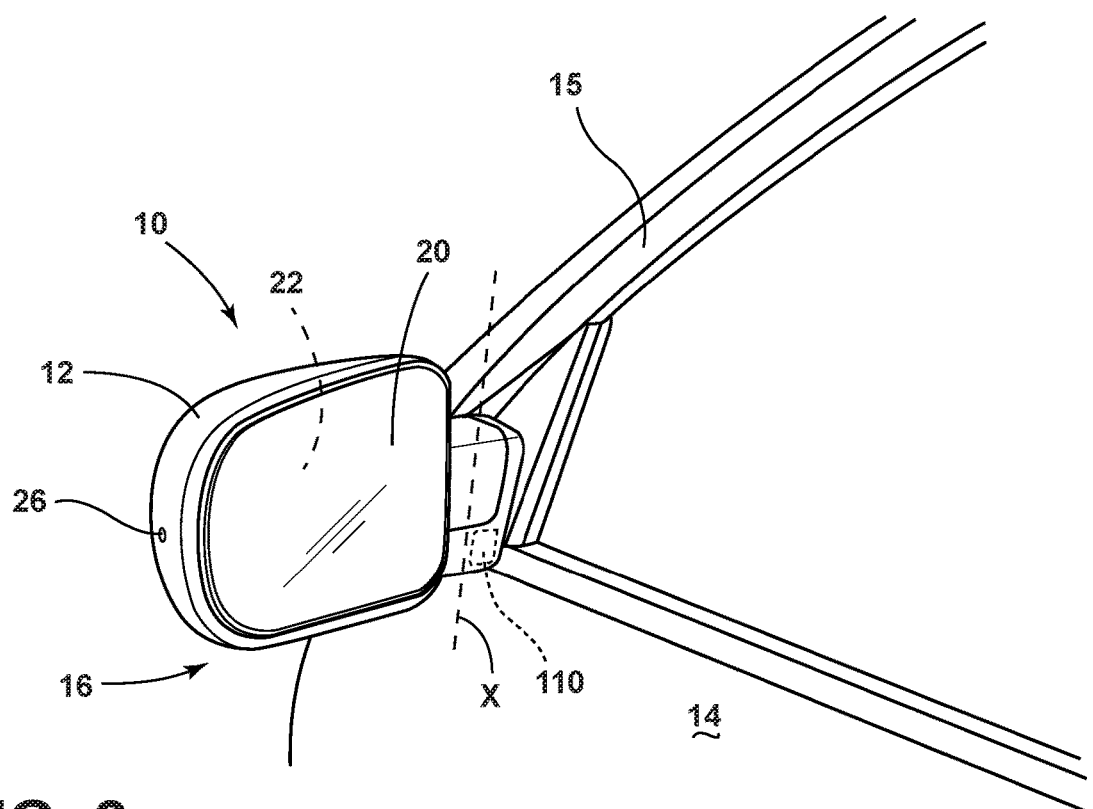
FIG. 2 is a front perspective view of an external rearview assembly of the present disclosure, with the external rearview assembly in an extended position.
Figure 3:
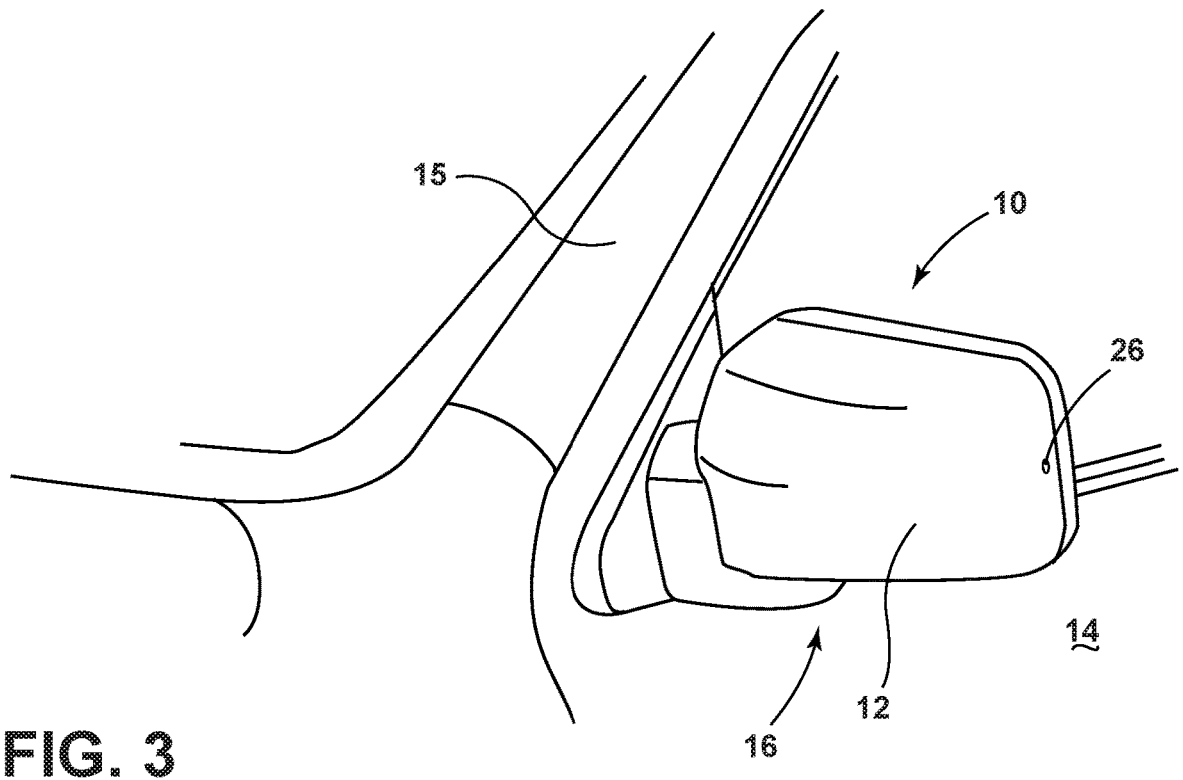
FIG. 3 is a rear perspective view of the external rearview assembly of FIG. 1.
Figure 4:
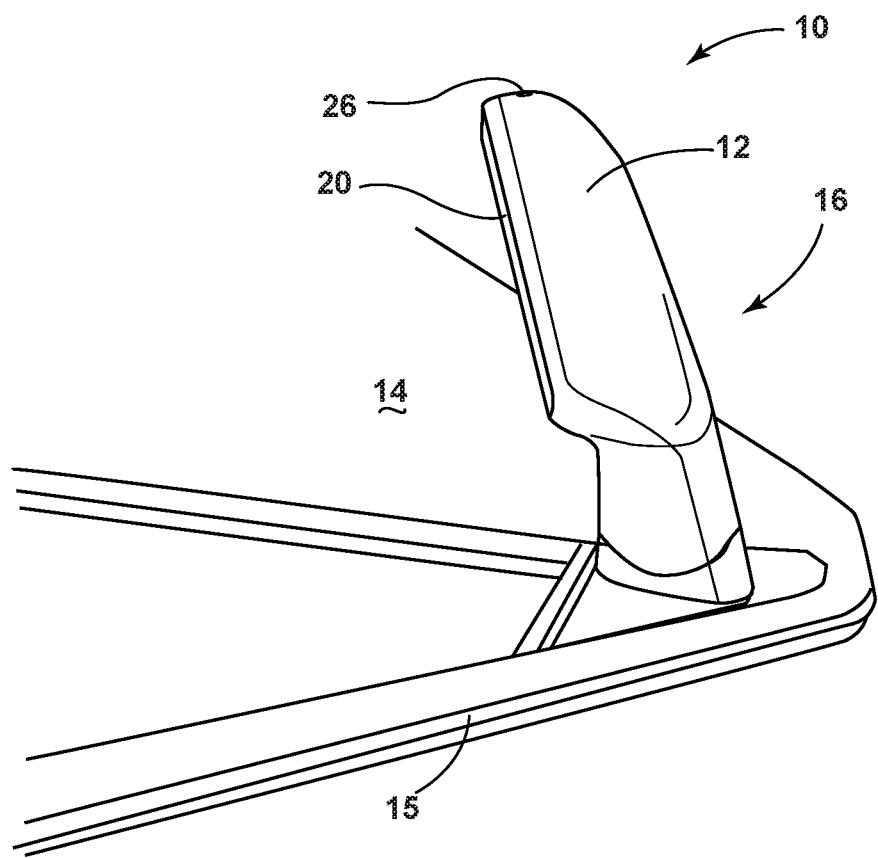
FIG. 4 is a top plan view of the external rearview assembly of FIG. 1.
Figure 5:
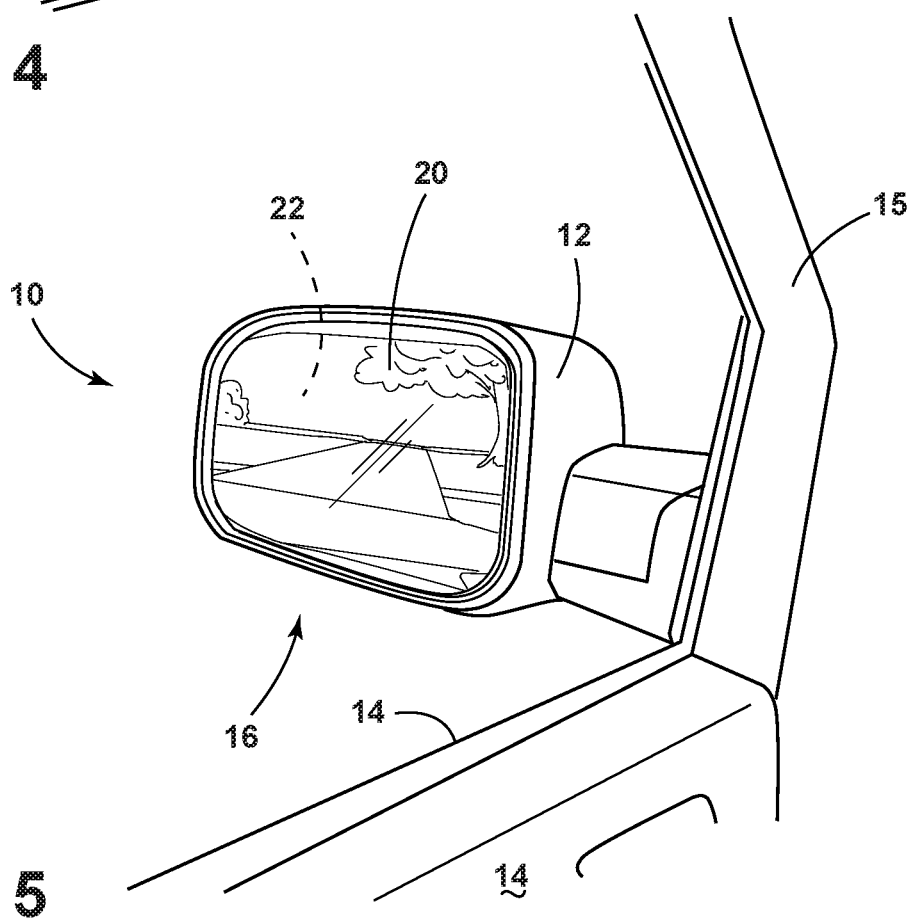
FIG. 5 is an inside front perspective view of the external rearview assembly of FIG. 1.
Figure 6:
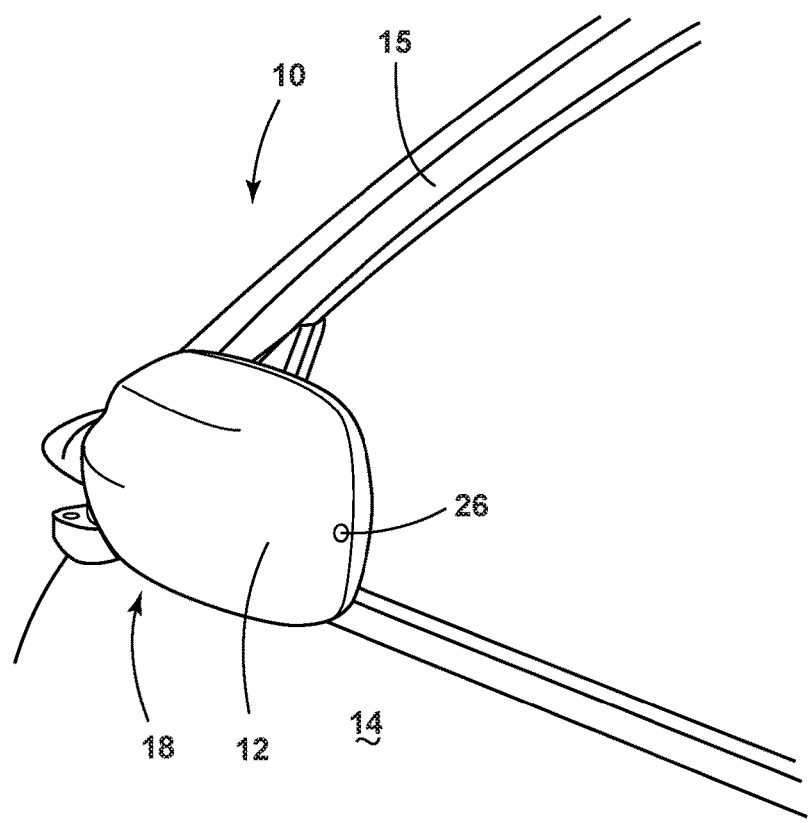
FIG. 6 is an outside front perspective view of an external rearview assembly of the present disclosure, with the external rearview assembly in a retracted position.
Figure 7:
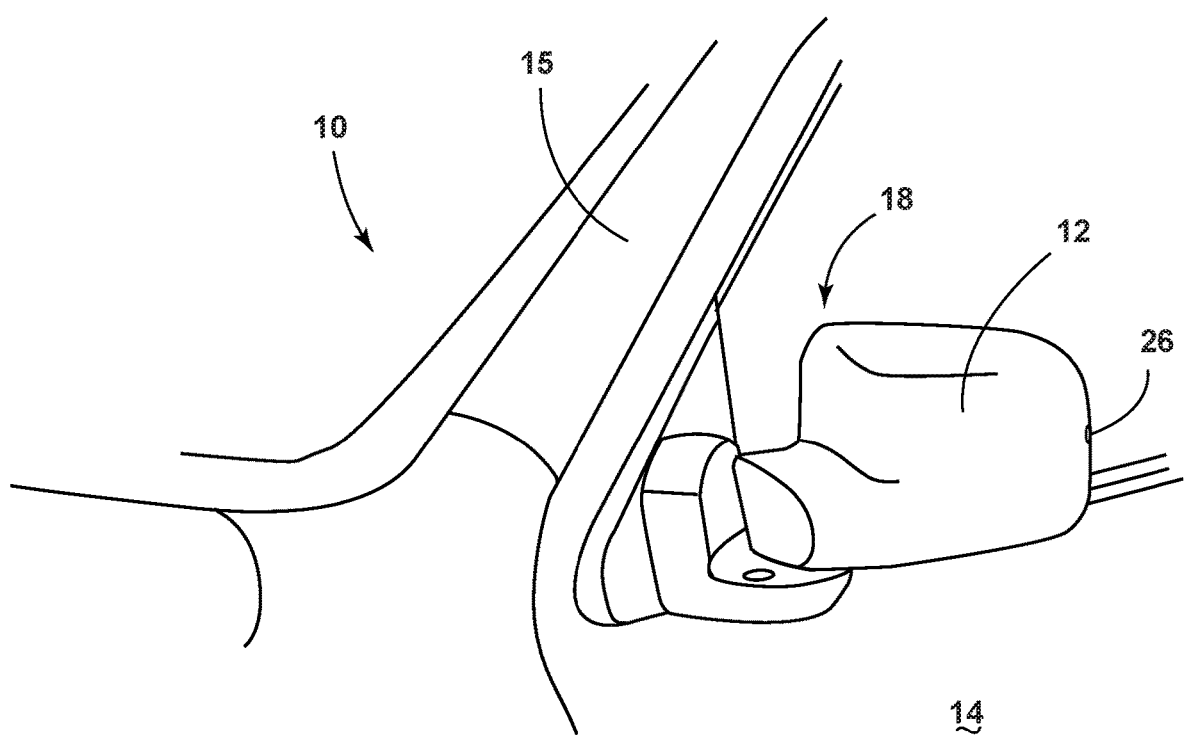
FIG. 7 is a rear perspective view of the external rearview assembly of FIG. 6.
Figure 8:
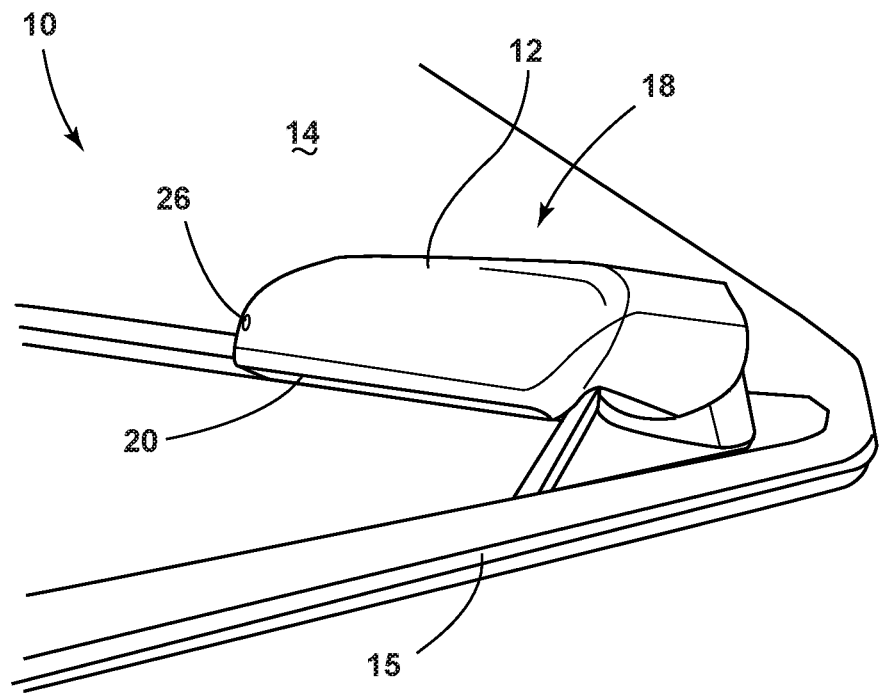
FIG. 8 is a top plan view of the external rearview assembly of FIG. 6.
Figure 9:
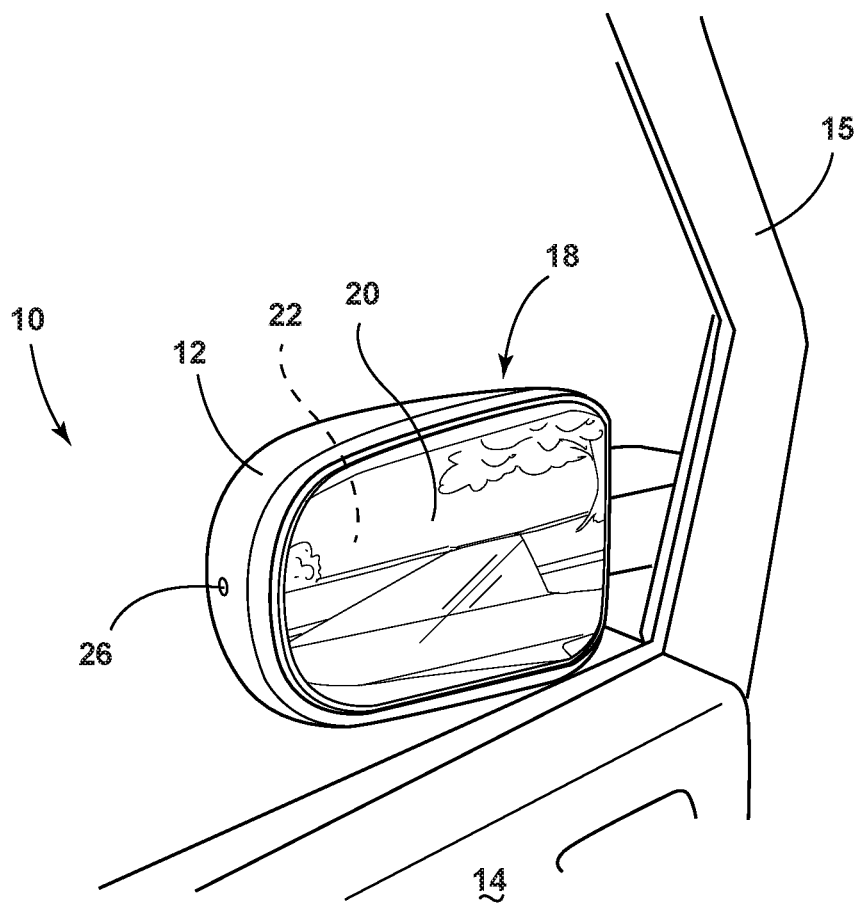
FIG. 9 is an inside front perspective view of the external rearview assembly of FIG. 6.

With reference again to FIG. 1A, the circuit board 34 may be a flexible circuit board or a rigid circuit board. In one instance, a printed circuit board is utilized because of its thin construction, thereby reducing the vertical profile of the external rearview assembly 10 and minimizing the amount of space that the external rearview assembly 10 occupies in the housing 12. Also, the flexibility of the printed circuit board 34 allows the circuit board 34 to follow the contours of the electro-optic element 20 smoothly and ensure good contact between the mating surfaces of the circuit board 34 and the electro-optic element 20. The circuit board 34 can be a monolithic, unitary structure formed from one type of board material, or it can be made from two or more types of board material bonded or connected together by any known means. The circuit board 34 can be any shape and occupy any portion of the electro-optic element 20. However, for the reasons explained herein, the circuit board 34 covers substantially the entire rear surface of the electro-optic element 20. Electronic components 60 of the external rearview assembly 10 may be arranged on the circuit board 34 so that the mass of the components 60 is near the center of gravity of the external rearview assembly 10 to minimize vibration of the external rearview assembly 10 after installation into the vehicle 15 (FIG. 2). The circuit board 34 is also operably coupled with the imager 24 and configured to activate and deactivate the imager 24, depending on the position of the housing 12. Fasteners may be disposed about the circuit board 34 to couple the circuit board 34 to other internal components or the housing 12.

As illustrated in FIG. 1A, the circuit board 34 drives a heater 70, which also extends across substantially all of a back side of the display module 22 and the circuit board 34. The heater 70 includes a conductive track 72. The circuit board 34, which has an area that occupies substantially all of a rear surface of the electro-optic element 20, enables a heat conductor 73, which is on the circuit board 34 and in communication with the conductive track 72. Generally, the electro-optic element 20 and the display module 22 may act as a heat sink for the circuit board 34 by way of the heater 70. At the same time, the heat conductor 73 heats the electro-optic element 20 and the display module 22, resulting in better performance of these modules. In this instance, the circuit board 34 may have the conductive track 72 on one side and the electronic components 60 on the other side. The larger coverage of the conductive track 72 area provides improved heat distribution over the electro-optic element 20 and the display module 22 and more efficient dissipation of heat from the circuit board 34 to the electro-optic element 20. The material used to form the conductive track 72 can be metal (e.g. copper), metal alloy, conductive ink, or any other conductive material. If conductive ink having a positive temperature coefficient, such as printed silver ink, is used to form the conductive track 72, a separate thermostat may not be necessary because the resistance of the ink increases rapidly as the temperature of the ink increases, making the conductive track 72 self-governing. By placing the conductive track 72 directly on the circuit board 34, on the surface opposite the electronic components 60 and in contact with the electro-optic element 20, the conductive track 72 allows efficient dissipation of heat away from the circuit board 34 and also allows the electro-optic element 20 to act as a heat sink at the same time. Further, the conductive track 72 acts heats the front substrate 40 of the electro-optic element 20, minimizing or eliminating any buildup of ice and mist on a first surface of the front substrate 40 of the electro-optic element 20. A thermostat or other heater control can also be provided in the electronic components 60 on the circuit board 34 and connected to the conductive track 72 so that heat flowing through the conductive track 72 can be controlled by, for example, pulse width modulation via a switching mechanism. It is also within the scope of the disclosure for a microprocessor on the circuit board 34 to provide temperature control internally of the circuitry. The electronic components 60 include a plug 74 that may be operably coupled with the imager 24.

The carrier plate 36 may be formed of molded plastic and may have a peripheral edge 80 defining a central void 82. The peripheral edge 80 is provided to accommodate mounting of a motor pack 83 proximate the void 82, which drives movement of the external rearview assembly 10 relative to the exterior housing 12 to change the angle of reflection visible by a driver. The electro-optic element 20 and the display module 22 are nested within the carrier plate 36 inside the housing 12. The void 82 is also sized to efficiently accommodate the imager 24. The imager 24 is disposed within the housing 12 and is in optical communication with the imager lens 26 positioned on the housing 12. The imager 24 includes a lens barrel 81 adjacent to the peripheral edge 80 of the carrier plate 36. To connect the components 60 of the external rearview assembly 10, an adhesive liquid or an adhesive tape or film 84, such as double-sided foam adhesive tape, may be provided between the circuit board 34 and the carrier plate 36 and attached over the circuit board 34. The film 84 includes an aperture 85 configured to accommodate the plug 74 so that it can attach with a receiver 86 on the imager 24. A power and/or data line 90 extends from the imager 24 through the carrier plate 36 and is operably coupled with a power source and/or data source of the vehicle 15.

With reference again to FIG. 1A, the circuit board 34 covers most or all of the rear surface of the electro-optic element 20. However, the electronic components 60 are clustered closer to a center of the circuit board 34. As can be seen in FIG. 1A, this arrangement allows the electronic components 60 to sit within the void 82 of the carrier plate 36 while allowing the conductive track 72 on the other side of the circuit board 34 to cover as much of the surface of the electro-optic element 20 as possible. The peripheral edge 80 is located at a mounting position of the motor pack 83 on the carrier plate 36. If needed, the peripheral edge 80 can be made thicker to create additional vertical distance for accommodating the electronic components 60 underneath the carrier plate 36.

Referring now to FIGS. 2-5 and 10, the external rearview assembly 10 is configured to provide a reflected image to a driver of a view rearward of the vehicle 15. The external rearview assembly 10 and be adjusted to provide an ideal field of view 100 based on the size of the passenger. The housing 12 protects the electro-optic element 20 and the imager 24 from the elements and possible damage during regular use. It will be understood that the external rearview assembly 10 may include various configurations including those set forth in U.S. Pat. Nos. 7,324,261; 6,195,194; and 5,923,457, the contents of which are hereby incorporated herein by reference in their entirety.

The external rearview assembly 10 is also rotatable about a pivot axis X (FIG. 2) between the extended position 16 (FIGS. 2-5 and 10) and the retracted position 18 (FIGS. 6-9 and 11). Rotation of the external rearview assembly 10 to the retracted position 18 can be useful to keep the external rearview assembly 10 from damage during washing of the vehicle 15 and to minimize the likelihood that another vehicle will strike the external rearview assembly 10 when the vehicle 15 is parked. Typically, the external rearview assembly 10 is not moved to the retracted position 18 unless the vehicle 15 is parked. This is because a rear view of the vehicle 15 is not attainable when the external rearview assembly 10 is folded inward toward the vehicle 15. Only a reflection of an internal portion of the vehicle 15 is reflected and visible.

With reference now to FIGS. 6-9 and 11, in the present disclosure, upon rotation of the external rearview assembly 10 to the retracted position 18, the imager 24 is activated. The electro-optic element 20 is configured to darken when the housing 12 is in the extended position 16 and lighten when the housing 12 is in the retracted position 18. Alternatively, the electro-optic element 20 may also be deactivated when the housing 12 is in the retracted position 18 so that a clear image can be provided to the driver. When the external rearview assembly 10 is in the retracted position 18, the imager 24 acquires image data and provides the image data to the display module 22 so that a field of view 102 can be displayed that is equal to or at least similar to the field of view 100 provided by the electro-optic element 20 of the external rearview assembly 10 when the external rearview assembly 10 is in the extended position 16. The imager 24 may be adjustable to provide a rearward field of view greater than or less than a field of view provided by the electro-optic element 20. It is generally contemplated that the imager 24 may be automatically activated upon rotation of the external rearview assembly 10 from the extended position 16 to the retracted position 18. However, it is also contemplated that the imager 24 may not be activated unless the vehicle 15 is in drive or reverse, or has otherwise been manually activated by the driver. For example, in the event a user is parking the vehicle 15 and wishes to move the external rearview assembly 10 from the extended position 16 to the retracted position 18, the user would simply park the vehicle 15 and manually adjust a motor 110 (FIG. 2) via an interface within the vehicle 15 to rotate the external rearview assembly 10. In this instance, the vehicle 15 is parked and use of the imager 24 is unnecessary. However, if a driver was traveling within the vehicle 15 and desired a rearward view of the vehicle 15 via the display module 22 rather than via the reflecting surface of the electro-optic element 20, the driver could simply activate the motor 110 of the external rearview assembly 10 via the interface to move the external rearview assembly 10 from the extended position 16 to the retracted position 18. During rotation, an internal switch, which may be one of the electronic components 60 on the circuit board 34, could be actuated which would activate both the imager 24 and the display module 22. Accordingly, a display of the rearview of the vehicle 15 within the field of view 100 would be displayed on the display module 22 through the electro-optic element 20 and visible to the driver.

Figure 10:
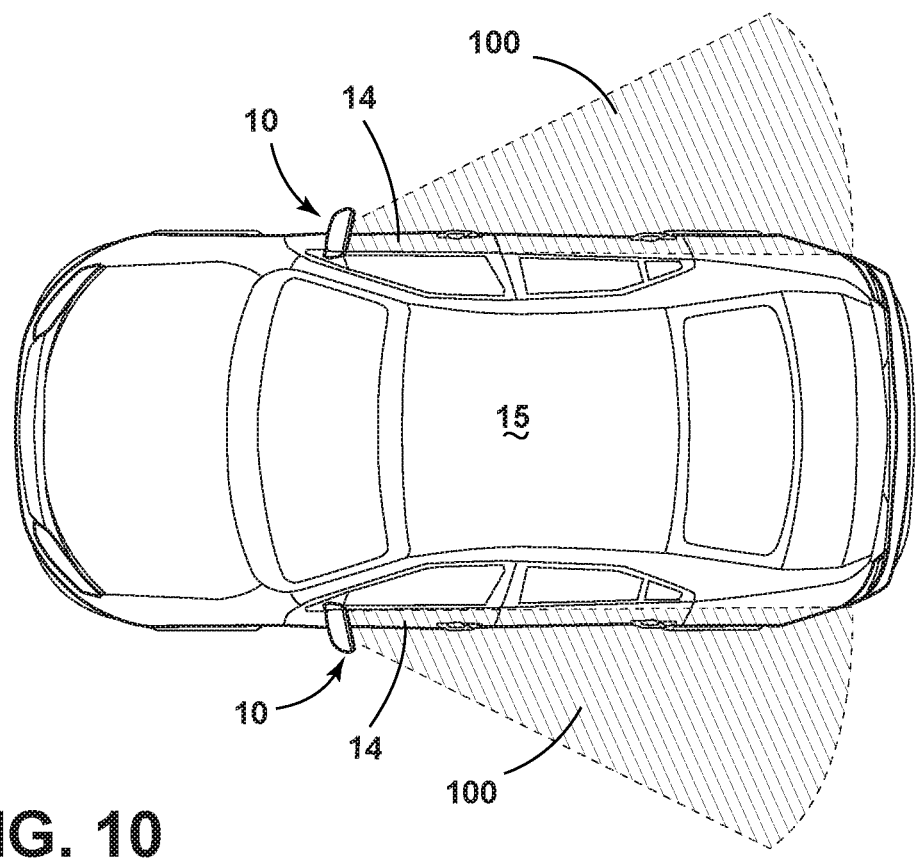
FIG. 10 is a top plan view of a vehicle of the present disclosure illustrating the field of view of a mirror element of the external rearview assembly.
Figure 11:
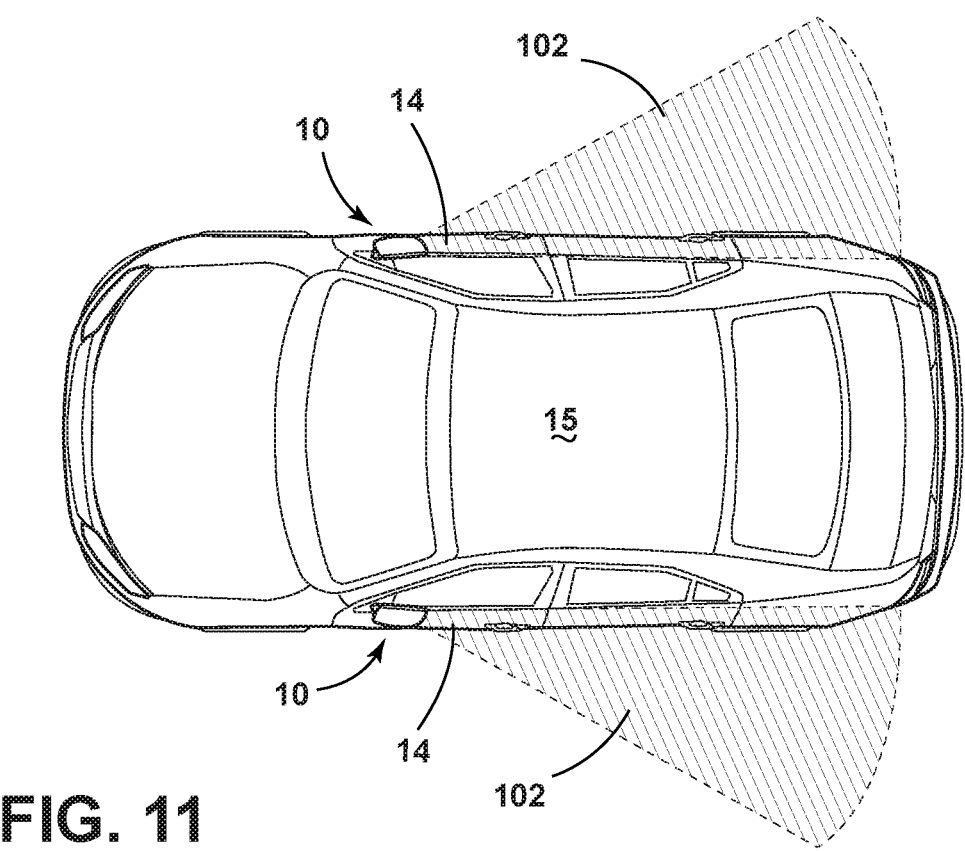
FIG. 11 is a top plan view of a vehicle of the present disclosure illustrating the field of view of an imager of the external rearview assembly.

With reference now to FIGS. 10 and 11, it will be generally understood that the rearward field of view 100 provided by the reflective surface of the electro-optic element 20 when the external rearview assembly 10 is in the extended position 16 (FIG. 10) is generally consistent with or at least similar with the rearward field of view 100 acquired by the imager 24 shown on the display module 22. Accordingly, the view that is provided by the display module 22 is similar with the view provided by the reflected surface of electro-optic element 20. This configuration provides for improved visibility, and may also provide improved viewing of a blind spot location of the vehicle 15. In addition, the imager 24 may be adjustable so that a desired field of view is provided on the display module 22. Enhanced or zooming functions may be capable with either or both of the imager 24 and the display module 22. Further, an increase in fuel efficiency can be readily observed when the external rearview assembly 10 is in the retracted position 18 because the wind resistance of the housing 12 of the external rearview assembly 10 is lessened.

As previously noted, the external rearview assembly 10, as set forth herein, is generally configured to include a lean profile so that the reflected image provided by the electro-optic element 20 may be the same as or similar to the field of view 100 of the imager 24 when the housing 12 is in the retracted position 18. In addition, the activation of the imager 24 and the display module 22 may occur automatically based on pre-determined drivers who desire a displayed image rather than a reflected image available during driving. Safety features of the system may also be present. For example, the external rearview assembly 10 may be configured to monitor the display module 22 to confirm image data output. If image data is not being shown on the display module 22, the external rearview assembly 10 will automatically move the housing 12 to the extended position 16 so that a reflected rearward view can be provided by the electro-optic element 20.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An external rearview assembly comprising:
    a housing pivotally coupled with a vehicle door and operable between an extended position and a retracted position;
    a dimmable electro-optic element including a front substrate with a reflective layer, a rear substrate, and an electro-optic medium disposed therebetween, the dimmable electro-optic element being operably coupled with the housing;
    a display module disposed proximate the dimmable electro-optic element, wherein the display module is activated when the housing is in the retracted position, and wherein the display module is deactivated when the housing is in the extended position; and
    an imager operably coupled with the housing and configured to capture image data when the housing is in the retracted position and display the image data on the activated display module, wherein a field of view displayed by the display module is the same as a field of view of a reflected image provided by the dimmable electro-optic element, and wherein the dimmable electro-optic element is configured to darken when the housing is in the extended position and lighten when the housing is in the retracted position.

2. The external rearview assembly of claim 1, wherein the imager is disposed within the housing and is in optical communication with an imager lens positioned on the housing.

3. The external rearview assembly of claim 1, wherein the imager is adjustable to provide a rearward field of view greater than or less than a field of view provided by the dimmable electro-optic element.

4. The external rearview assembly of claim 1, wherein the dimmable electro-optic element and the display module are nested within a carrier plate inside the housing.

5. The external rearview assembly of claim 4, wherein the imager includes a lens barrel adjacent to a peripheral edge of the carrier plate.

6. The external rearview assembly of claim 1, further comprising:
    a circuit board operably coupled with the imager and configured to activate and deactivate the imager.

7. The external rearview assembly of claim 6, further comprising:
    a heater disposed between the circuit board and the dimmable electro-optic element.

8. The external rearview assembly of claim 7, wherein the heater extends across substantially all of a back side of the display module and the circuit board.

9. An external rearview assembly for a vehicle comprising:
    a housing including a proximal end pivotally coupled with a vehicle door, the housing being operable between an extended position and a retracted position;
    an electro-optic element including a front substrate, a rear substrate, and an electro-optic medium disposed therebetween, the electro-optic element being operably coupled with the housing;
    a display module disposed proximate the electro-optic element, wherein the display module is activated when the housing is in the retracted position, and wherein the display module is deactivated when the housing is in the extended position;
    an imager operably disposed on a distal end of the housing and configured to capture image data behind said vehicle when the housing is in the retracted position and said vehicle is traveling, wherein the electro-optic element is configured to lighten when in the retracted position, and wherein the imager is adjustable when the housing is in the retracted position to provide a desired rearward field of view on the display module; and
    a circuit board operably coupled with the imager and configured to activate and deactivate the imager, wherein a heater is disposed between the circuit board and the electro-optic element.

10. The external rearview assembly of claim 9, wherein the electro-optic element is configured to darken when the housing is in the extended position.

11. The external rearview assembly of claim 9, wherein the electro-optic element and the display module are nested within a carrier plate inside the housing.

12. An external rearview assembly comprising:

a housing pivotally coupled with a vehicle door and operable between an extended position and a retracted position;

an electro-optic element operable between a darkened condition and a lightened condition, the electro-optic element being operably coupled with the housing;

a display module disposed proximate the electro-optic element, wherein the display module is activated when the housing is in the retracted position and the electro-optic element is in the lightened condition, and wherein the display module is deactivated when the housing is in the extended position;

an imager adjustable to capture a desired field of view of image data and display the image data on the activated display module;

a safety feature configured to monitor the display module to confirm image data output by the display module such that when there is a failure of the display module to output the image data, the housing automatically moves to the extended position so that a reflected rearward view can be provided by the electro-optic element; and a circuit board operably coupled with the imager and configured to activate and deactivate the imager, wherein a heater extends across substantially all of a back side of the display module and the circuit board.

13. The external rearview assembly of claim 12, wherein the imager is disposed within the housing and is in optical communication with an imager lens positioned on the housing.

14. The external rearview assembly of claim 12, wherein the imager is adjustable to provide a rearward field of view greater than or less than a field of view provided by the electro-optic element.

\* \* \* \* \*